United States Patent
Campinos et al.

[11] Patent Number: 6,091,818
[45] Date of Patent: Jul. 18, 2000

[54] CONDITIONAL ACCESS SYSTEM USING MESSAGES WITH MULTIPLE ENCRYPTION KEYS

[75] Inventors: Arnaldo Campinos; Jean-Bernard Fischer, both of Rennes, France

[73] Assignee: Thomson multimedia, S.A., France

[21] Appl. No.: 08/901,842

[22] Filed: Jul. 28, 1997

[30] Foreign Application Priority Data

Jul. 29, 1996 [FR] France .................................. 96 09501

[51] Int. Cl.$^7$ .................................................. H04K 1/00
[52] U.S. Cl. .................................................. 380/25; 380/4
[58] Field of Search .................................. 380/25, 23, 4; 395/186; 340/182, 5.31

[56] References Cited

U.S. PATENT DOCUMENTS

| | | | |
|---|---|---|---|
| 5,191,611 | 3/1993 | Lang | 380/25 |
| 5,703,951 | 12/1997 | Dolphin | 380/25 |
| 5,721,781 | 2/1998 | Deo | 380/25 |

FOREIGN PATENT DOCUMENTS

| | | |
|---|---|---|
| 679 029 | 10/1995 | European Pat. Off. . |
| 258 3946 | 12/1986 | France . |
| WO 96 06 504 | 2/1996 | WIPO . |

OTHER PUBLICATIONS

European Search Report.

*Primary Examiner*—Tod R. Swann
*Assistant Examiner*—Todd Jack
*Attorney, Agent, or Firm*—Joseph S. Tripoli; Peter M. Emanuel; David T. Shoneman

[57] ABSTRACT

The invention relates to a conditional access system making it possible for a service provider to supply his services solely to users having acquired entitlements to these services.

The services supplied by a service provider consist of an item scrambled by control words. To keep these control words secret, they are supplied in messages (MEC) after having been encrypted with an encryption algorithm with key K.

According to the invention, one and the same message (MEC) contains the same control word (Cwi) encrypted several times, each encryption (E(Cwi)Kj) of the control word depending on a different encryption key (Kj).

The invention applies to any type of conditional access system, be this system either of "off-line" or "on-line" type.

35 Claims, 3 Drawing Sheets

CONDITIONAL ACCESS SYSTEM USING MESSAGES WITH MULTIPLE ENCRYPTION KEYS

BACKGROUND OF THE INVENTION

The present invention relates to a conditional access system.

A conditional access system allows a service provider to supply his services solely to users having acquired entitlements to these services. Such is the case, for example, in pay television systems.

As is known to a person skilled in the art, the service supplied by a service provider consists of an item scrambled by control words. The scrambled item can be descrambled, and therefore read by the user, only with regard to the entitlements allocated to this user. The scrambled item will subsequently be denoted IE(ECG), where ECG represents the unscrambled item.

To descramble the item, the service provider supplies each user with the control words which served for scrambling the item. To keep the control words secret, they are supplied after having been encrypted with an algorithm with key K. The various encrypted control words are sent to the various users in messages which, for convenience, will be denoted MEC in the subsequent description.

So as to accord access to its service solely to authorized users, the service provider supplies a smart card and a decoder to each of the users.

The smart card makes it possible, on the one hand, to validate and record the entitlements which the user has to the service delivered and, on the other hand, to decrypt the encrypted control words. For this purpose, the smart card contains the key K of the algorithm which allowed the encryption of the control words.

The decoder, for its part, makes it possible to descramble the scrambled item on the basis of the item consisting of the encrypted control words from the smart card.

The entitlements of each user are sent in messages which, for convenience, will be denoted MD in the subsequent description.

According to the prior art, a message MD dedicated to a user contains three main items:
  a first item giving the address of the user's card,
  a second item giving the description of the user's entitlements;
  a third item making it possible to validate the message MD and verify that the user's entitlements contained in the message MD are indeed the entitlements reserved for the user.

As mentioned previously, the encrypted control words are sent to the users by way of the messages MEC.

According to the prior art, a message MEC consists of a header and a body:
  the header gives, among other things, the type and size of the items contained in the body of the message MEC;
  the body consists, among other things, of an item containing the set of conditions of access to the service supplied by the provider, of an item containing a control word encrypted with the algorithm with key K and of an item containing a datum depending on the key K and making it possible to validate and verify the content of the message MEC and, more particularly, access conditions contained in the message MEC.

When the decoder of a user recognizes the address of the card associated therewith among the various addresses distributed by the service provider, the message MD corresponding to the recognized address is analysed. The analysis of the message MD is performed with the aid of an analysis algorithm controlled by the encryption key of the control words.

Conditional access systems are mainly of two types.

A first system is commonly called an on-line system. In a conditional access system of the "on-line" type, the scrambled item IE (ECG) is an item consisting of a signal distributed simultaneously to the various customers of the service provider from a single source. This distribution can be performed, for example, over the airways or else by cable. As is known to a person skilled in the art, in such a conditional access system, the messages MEC are sent by the service provider with the scrambled item IE (ECG).

A second conditional access system is commonly called an off-line system. In a conditional access system of "off-line" type, the scrambled item IE (ECG) and the messages MEC are contained on off-line information media such as, for example, compact discs, digital video discs, or else digital optical discs.

The invention will be more particularly described in the case of off-line systems. However, as will emerge later, the invention relates to any type of access control system, be this system either of off-line or on-line type.

As mentioned previously, the key of the encryption algorithm for the control words is contained in each user card. It follows that the pirating of a single card may lead to the knowledge of the key K. The service supplied by the provider is then no longer protected.

The service provider must then supply each user with a new card containing a new key K. Now, in the case of off-line systems, the off-line information medium constituted by, for example, the compact disc, the digital video disc or else the digital optical disc, has a fixed content which it is not possible to modify. To ensure the continuity of the service he has to supply, the service provider is then compelled, not only to market new off-line information media compatible with the new encryption key, but also completely to renew the existing pool of off-line information media which he distributed before the change of encryption key of the control words.

This represents a drawback, especially in terms of costs, since the number of off-line information media may frequently reach several hundred thousand, or even several million.

Figure 1:
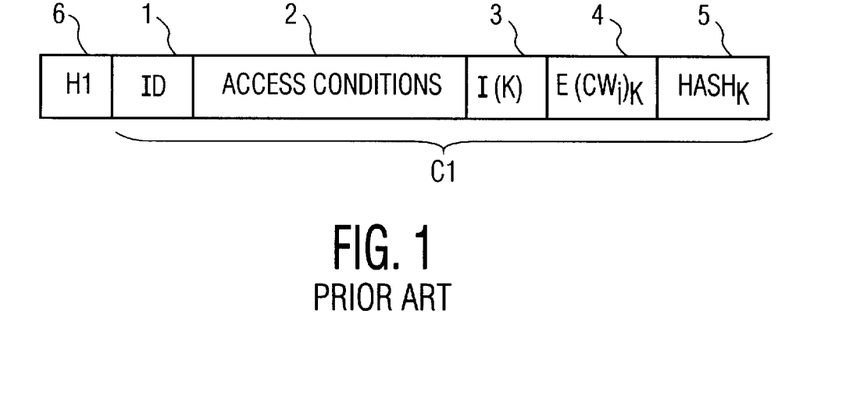

FIG. 1 represents a format of a message MEC according to the prior art.

The message MEC consists of a body C1 and a header 6, the content (H1) of which gives, among other things, the type and size of the items contained in the body C1.

The body C1 comprises, among other things, a first item 1, the content (ID) of which makes it possible to identify the service provider, a second item 2 containing the set of access conditions associated with the service supplied by the provider, a third item 3, the content (I(K)) of which gives the index of the key K of the encryption algorithm for the control words, a fourth item 4 containing a control word Cwi encrypted with the algorithm with key K (E(Cwi)K) and a fifth item 5 containing a datum $HASH_K$ making it possible to validate and verify the content of the message MEC and, more particularly, access conditions contained in the message MEC. The datum $HASH_K$ is controlled by the key K for encryption of the control words.

In FIG. 1, the control word Cwi represents the current control word, that is to say that making it possible to descramble the part of the program being read. As is known to a person skilled in the art, the message MEC which contains Cwi generally also contains a second control word. This second control word is the control word for the next descrambling period, that is to say the current control word of the message MEC which is to follow the message MEC which contains Cwi as current control word. It is so as not to needlessly encumber the drawing that this second control word has not been represented in FIG. 1.

As is known to a person skilled in the art, the format of the message MEC described in FIG. 1 is merely an MEC message format example. In particular, the order defining the succession of the various blocks 1, 2, 3, 4, 5 making up the message MEC can be modified.

Figure 2:
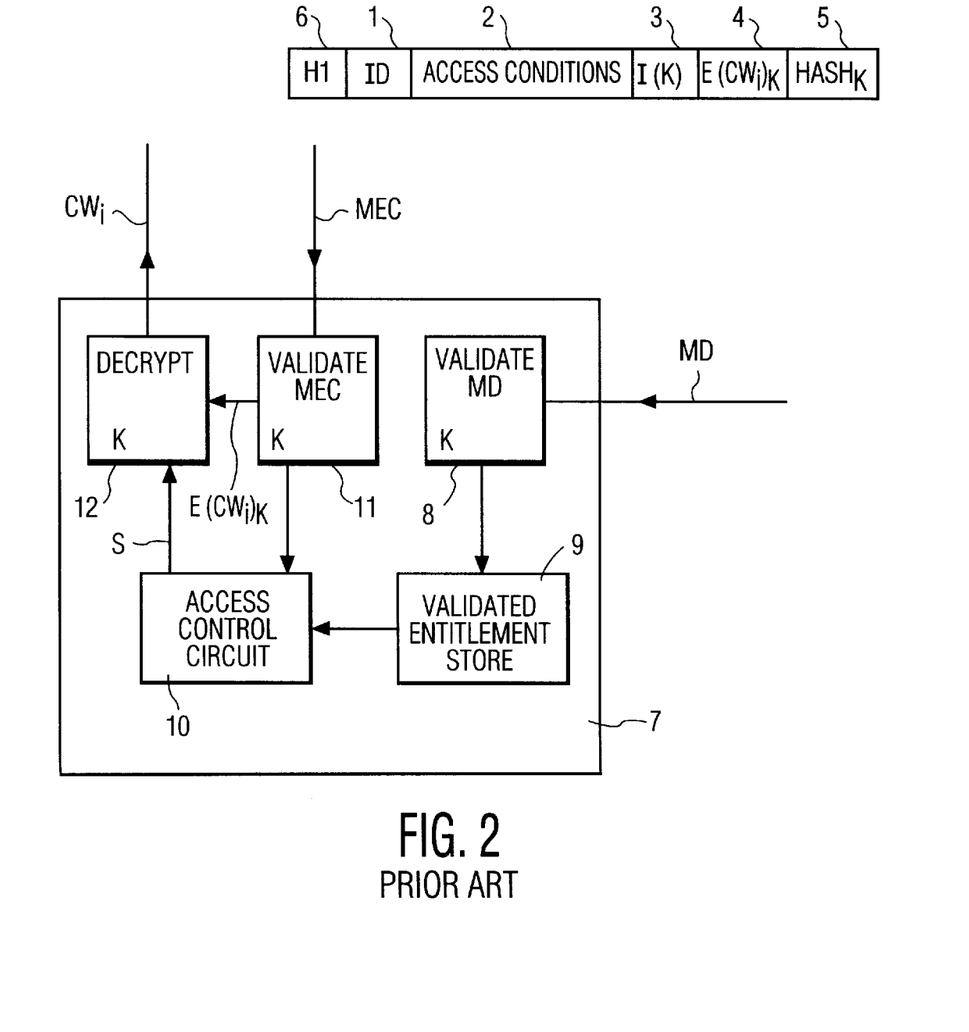

FIG. 2 represents the schematic of a user card according to the prior art.

The user card 7 contains five main circuits:
a circuit 8 for validating the user's entitlements;
a circuit 9 for storing the validated entitlements of the user;
a circuit 10 for access control;
a circuit 11 for validating the messages MEC;
a circuit 12 for decrypting the encrypted control words.

The validation circuit 8 makes it possible to perform on the messages MD the operations of user address recognition and user entitlements analysis. For this purpose, the validation circuit 8 contains the key K of the encryption algorithm. If the message MD is validated, the user's entitlements contained in the message MD are stored in the validated entitlements storage circuit 9.

The circuit 11 for validating the messages MEC makes it possible to perform on the access conditions 2 contained in the messages MEC operations identical to those performed by the validation circuit 8 on the user's entitlements contained in the messages MD. The validation circuit 11 contains the key K.

The decryption circuit 12 makes it possible to decrypt the control words. For this purpose, the decryption circuit 12 also contains the key K of the encryption algorithm for the control words.

The access control circuit 10 compares the validated access conditions with the validated entitlements of the user. If the validated access conditions correspond to the validated entitlements of the user, a signal S, emanating from the access control circuit 10 and applied to the decryption circuit 12, authorizes decryption of the control words. In the contrary case, the signal S does not authorize decryption.

At the completion of the various steps of the decryption procedure, the decrypted control words Cwi are generated by the decryption circuit 12 so as to allow the descrambling of the scrambled item IE (ECG).

SUMMARY OF THE INVENTION

In general, the present invention relates to a novel conditional access system.

More particularly, the invention also relates to a novel definition of the messages MEC, a novel user card, as well as a novel off-line information medium in the case of off-line systems.

Thus, the invention relates to a message (MEC) making it possible to deliver conditions of access to a scrambled service intended for at least one user, the said message containing a first item consisting of a control word encrypted by an algorithm with key K1, a second item, the content of which makes it possible to validate and verify the content of the message, the content of the second item being controlled by a key Q. The message contains n−1 additional items each containing the said control word encrypted by an encryption algorithm with respective keys K2, K3, . . . , Kj, . . . , Kn.

The keys K1, K2, K3, . . . , Kn are different from one another.

The invention also relates to a process making it possible to descramble a scrambled service (IE(ECG)) supplied to at least one user, the service being scrambled with the aid of control words, the process comprising at least one step making it possible to supply the user with a message (MEC) containing a first item consisting of a control word encrypted with an algorithm with key K1. The step makes it possible to distribute in the message n−1 additional items each containing the control word encrypted by an algorithm with respective keys K2, K3, . . . , Kn.

The keys K1, K2, . . . , Kn are different from one another.

The invention also relates to a smart card making it possible to decrypt the encrypted control words which it receives, the encrypted control words being sent to the smart card via a message such as that mentioned above according to the invention.

The invention also relates to a conditional access system making it possible for a service provider to supply his services only to users having acquired entitlements to these services, the said services consisting of an item scrambled by control words, the said system comprising, for each user, at least one decoder and at least one user card, the said card containing, on the one hand, circuits making it possible to validate and record the user entitlements to the service delivered by the provider, the said entitlements being conveyed to the user card by a first message (MD) and, on the other hand, circuits making it possible to retrieve the control words from the control words encrypted by an algorithm with key K, the said encrypted control words being conveyed to the user card by a second message (MEC). The user card is a card such as that mentioned above according to the invention and the second message (MEC) is a message such as that mentioned above according to the invention.

The invention further relates to an off-line information medium containing an item scrambled by a string of N control words. The off-line information medium comprises p item strings consisting of N encrypted control words, each item string making it possible to descramble a scrambled item, p being an integer greater than or equal to 1.

The key of the encryption algorithm for the control words is contained in each user card.

According to the invention, when the pirating of the user cards leads to the knowledge of the key of the encryption algorithm for the control words, the service provider changes the key as well as the key index which are contained in the user cards by choosing a new encryption algorithm key as well as a new key index from among the keys and the key indices already contained in the messages MEC.

In the case of off-line systems, for example, an advantage of the invention is to prevent the change of encryption algorithm key for the control words from entailing the renewal of the entire pool of off-line information media distributed before the change of key.

BRIEF DESCRIPTION OF THE DRAWINGS

Other characteristics and advantages of the invention will emerge on reading a preferred embodiment given with reference to the appended figures in which:

FIG. 4 represents the schematic of a user card operating with a message MEC according to FIG. 3a;

In all the figures, the same labels designate the same elements.

DESCRIPTION OF THE PREFERRED EMBODIMENT

Figure 3A:
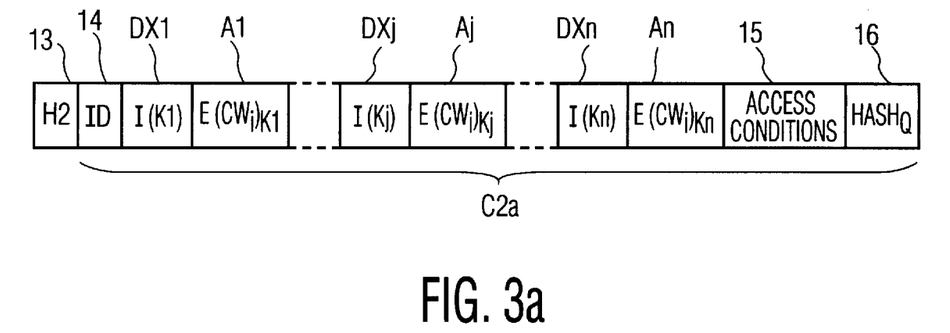
FIGS. 3a and 3b represent two formats of a message MEC according to the invention.

FIG. 3a represents a first MEC message format according to the invention.

The message MEC consists of a body C2a and a header 13, the content (H2) of which gives, among other things, the type and size of the items contained in the body C2a.

The body C2a comprises, among other things, an item 14, the content (ID) of which makes it possible to identify the service provider, n items A1, ..., Aj, ..., An respectively containing the same control word Cwi enciphered with algorithms with respective keys K1, ..., Kj, ..., Kn, n items DX1, ..., Dxj, ..., DXn containing the indices I(K1), ..., I(Kj), ..., I(Kn) making it possible to recognize the respective keys K1, ..., Kj, ..., Kn, an item 15 containing the set of access conditions associated with the service supplied by the service provider, and an item 16 containing a datum $HASH_Q$ making it possible to validate and verify the content of the message MEC and, more particularly, access conditions contained in the message MEC. The datum $HASH_Q$ is controlled by a key Q preferably different from any one of the encryption keys K1, ..., Kj, ..., Kn.

According to a first embodiment of the invention, the algorithm with key Kj is the same irrespective of the rank j (j=1, 2, ..., n) of the key Kj. This may, for example, be the algorithm known by the abbreviation RSA ("RIVEST SHAMIR ADLEMAN"), the algorithm known by the abbreviation SDE ("Syndrome Decoding Engine"), or again the algorithm known by the abbreviation DES ("Data Encryption Standard").

According to the invention, the algorithm with key Kj can be identical or different for all or some of the keys Kj (j=1, 2, ..., n).

Advantageously, according to a particular embodiment of the invention, the various keys Kj which are used successively may be chosen with size increasing with the rank j of the key Kj. Any pirates are then placed in a situation in which the pirating of the various keys is made increasingly difficult.

According to FIG. 3a, the various items constituting the body of the message MEC according to the first format of the invention follow one another in a certain order. The invention relates, however, to the formats of messages MEC for which the order of the items is different from that represented in FIG. 3a.

Figure 3B:
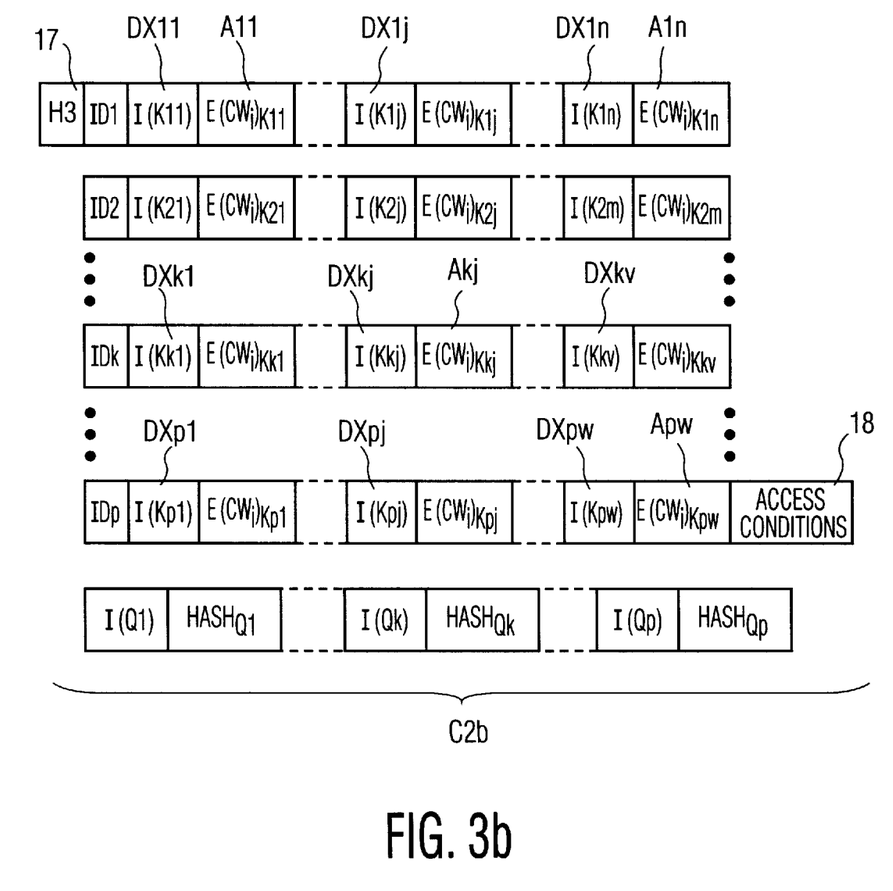

FIG. 3b represents a second MEC message format according to the invention.

The message MEC consists of a body C2b and a header 17, the content (H3) of which gives, among other things, the type and size of the items contained in the body C2b.

The body C2b comprises, among other things:

p items ID1, ID2, IDK, ... IDp allowing each to identify one of the p service providers, p being an integer, n items A11, ..., A1j, ..., A1n, for the provider of rank 1, n being an integer, m items A21, ..., A2j, ..., A2m, for the provider of rank 2, m being an integer, v items Ak1, ..., Akj, ..., Akv, for the provider of rank k, v being an integer, w items Ap1, ..., Apj, ..., Apw, for the provider of rank p, w being an integer, each of the n+m+ ... +v+ ... +w items A11, ..., Akj, ..., Apw containing, according to the preferred embodiment of the invention, the same control word Cwi encrypted with an algorithm with respective keys K11, ..., Kkj, ..., Kpw, n items DX11, ..., DX1j, ..., DX1n for the provider of rank 1, m items DX21, ..., DX2j, ..., DX2n for the provider of rank 2, v items DXk1, ..., DXkj, ..., DXkv for the provider of rank k, w items DXp1, ..., DXpj, ..., DXpw, for the provider of rank p, each of the n+m+ ... +v+ ... +w items DX11, ..., DXkj, ..., DXpw containing the indices I(K11), ..., I(Kkj), ..., I(Kpw) making it possible to recognize, as will be specified later, the respective keys K11, ..., Kkj, ..., Kpw, the indices with keys I (Kk1), ... I(Kkj), ..., I(Kkp) of the service provider of rank k (k=1, 2, ..., p) defining an order k encryption keys index field, an item 18 containing the set of access conditions associated with the service supplied by the p service providers, the said access conditions being common to the p service providers according to the preferred embodiment of the invention, a set of p data $HASH_{Q1}$, ..., $HASH_{Qk}$, ..., $HASH_{Qp}$, the datum $HASH_{Qk}$ making it possible to validate and verify the content of the access conditions contained in the message MEC as well as that part of the message MEC associated with the service provider of rank k. The datum $HASH_{Qk}$ is controlled by a key Qk. The keys Q1, ..., Qj, ..., Qp being preferably different from one another and different from the encryption keys Kkj, a set of p data I(Q1), ..., I(Qk), ..., I(Qp) constituting a control keys index field, the key index I(Qk) making it possible, as will be specified later, to recognize datum $HASH_{Qk}$.

According to the above-described preferred embodiment of the invention, each of the n+m+ ... +v+ ... +w items A11, ..., Akj, ..., Apw contain the same control word Cwi encrypted with an algorithm with respective keys K11, ..., Kkj, ..., Kpw.

According to that embodiment of the invention described in FIG. 3b, the access conditions 18 are common to the p service providers. According to other embodiments of the invention, the access conditions are different from one service provider to another or from one group of service providers to another.

As mentioned previously, the order in which the various items constituting the body of the message MEC follow one another may be different from that represented in FIG. 3b.

According to a particular embodiment of the invention, the encryption algorithm with key Kkj of the service provider of rank k (k=1, 2, ..., p) is the same irrespective of the rank j of the key Kkj.

According to embodiments different from the particular embodiment mentioned above, the encryption algorithm with key Kkj can be different according to the rank k of the key Kkj.

As in the case of the message MEC described in FIG. 3a, the various keys Kkj which are successively used by the same service provider may advantageously be of a size increasing with the rank j of the key Kkj so as to make pirating increasingly difficult.

Figure 4:
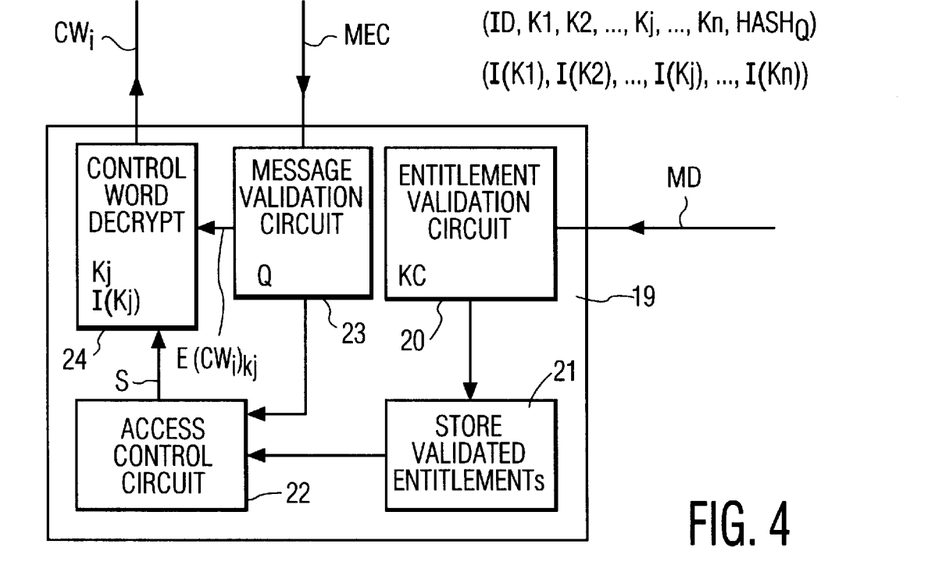

FIG. 4 represents a user card operating with a message MEC according to FIG. 3a.

The user card contains five main circuits:

a circuit 20 for validating the user's entitlements;

a circuit 21 for storing the validated entitlements of the user;

a circuit 22 for access control;

a circuit 23 for validating the messages MEC;

a circuit 24 for decrypting the encrypted control words.

The validation circuit 20 makes it possible to perform on the messages MD the operations of user address recognition and user entitlements analysis.

The analysis of the message MD is performed with the aid of an analysis algorithm depending on a key KC contained in the validation circuit 20. The key KC is preferably a different key from any one of the encryption keys Kj (j=1, 2, . . . , n). If the message MD is validated, the user's entitlements contained in the message MD are stored in the validated entitlements storage circuit 21.

The validation circuit 23 makes it possible to perform on the access conditions contained in the messages MEC validation operations identical to those performed on the user's entitlements contained in the messages MD. The validation of the messages MEC is performed with the aid of a validation algorithm controlled by the key Q. The key Q is contained in the circuit 23.

The decryption of the encrypted control word E(Cwi)Kj is performed with the aid of the key Kj of the encryption algorithm when the key Kj is the key contained in the deciphering circuit 24.

When the key Kj is contained in the decryption circuit 24, the latter also contains the index I(Kj) which makes it possible to recognize the encrypted control word E(Cwi)Kj from among the set of encrypted control words contained in the message MEC. When the control word E(Cwi)Kj has been recognized, the latter is transferred from the validation circuit 23 to the decryption circuit 24. Decryption then takes place.

The access control circuit 22 compares the validated access conditions with the validated entitlements of the user. If the validated access conditions correspond to the validated entitlements of the user, a signal S, emanating from the access control circuit 22, authorizes decryption of the control word. In the contrary case, the signal S does not authorize decryption.

As mentioned previously, the pirating of a user card may lead to the knowledge of the control words encryption key contained in the user card. When pirating becomes excessive, the service provider distributes new user cards. The decryption circuit for the control words of the new user cards then contains a new encryption key as well as a new encryption key index.

The new encryption key as well as the new key index are contained in the messages MEC according to the invention.

In the case of off-line systems, to ensure the permanence of his service, the service provider supplies his new customers with new off-line information media in which the control words encrypted with the key being pirated are deleted.

As mentioned previously, advantageously, according to the invention, the off-line information media distributed before the change of encryption key are still usable after this change. Thus, the use of these information media can be performed either with a card containing the new encryption key, or with an old card not containing the new encryption key. Likewise, and in reciprocal manner, the off-line information media distributed after the change of encryption key can advantageously no longer be read with the user cards containing the old encryption key as is the case, particularly, in pirated cards.

In the case of on-line systems, the service provider recovers the user cards containing the pirated key and replaces them with new cards containing a new encryption key such as that mentioned above.

Advantageously, a transient period in respect of the distribution of new user cards may then be established. Throughout the transient period, the messages MEC disseminated by the service provider contain control words encrypted with the key being pirated and the control words encrypted with the new encryption key. When all the user cards have been renewed, the service provider now issues only messages MEC containing the new encryption key.

By way of non-limiting example, the number of versions of encryption of control words, that is to say the number of encryption algorithm keys for the control words, may be between 5 and 10.

Figure 5:
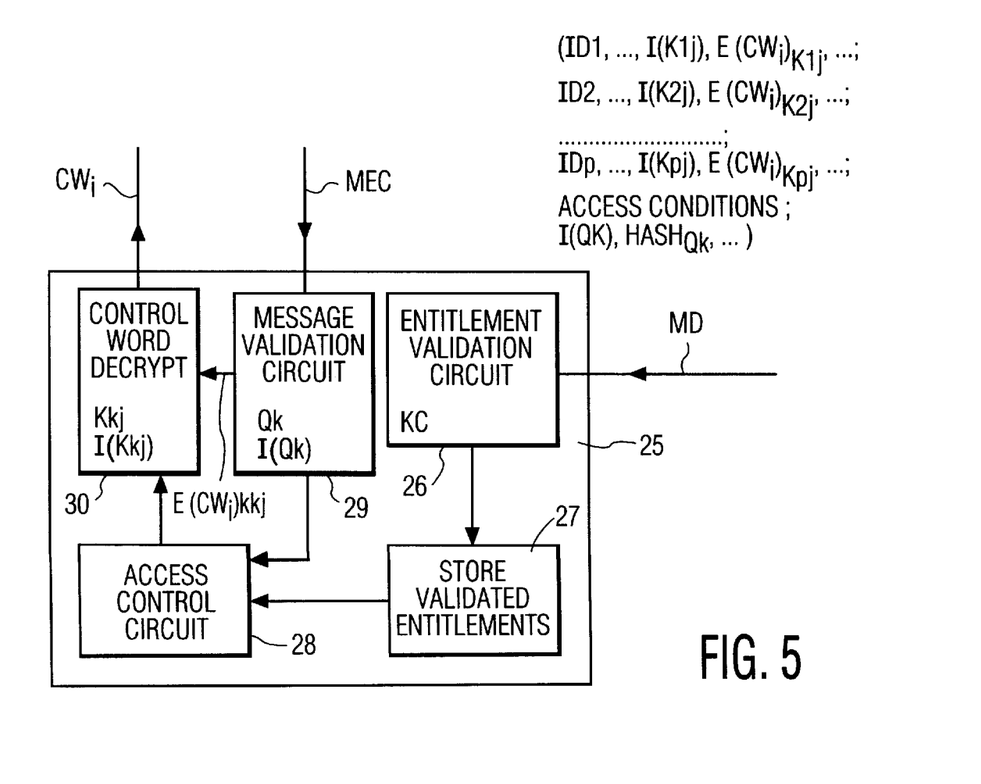
FIG. 5 represents the schematic of a user card operating with a message MEC according to FIG. 3b.

FIG. 5 represents the schematic of a user card operating with a message MEC according to FIG. 3b.

The user card 25 of FIG. 5 is the card associated with the service provider of rank k.

The user card 25 contains five main circuits:

a circuit 26 for validating the user's entitlements;

a circuit 27 for storing the validated entitlements of the user;

a circuit 28 for access control;

a circuit 29 for validating the messages MEC;

a circuit 30 for decrypting the encrypted control words.

The circuits 26, 27 and 28 have functions identical to those of the respective circuits 20, 21 and 22 described previously.

The analysis of the messages MD is performed with the aid of an analysis algorithm depending on a key KC contained in the validation circuit 26. The key KC is preferably a different key from the encryption key contained in the decryption circuit 30.

The circuit 29 makes it possible to perform the validation of the access conditions as well as that part of the message MEC associated with the service provider of rank k. For this purpose the circuit 29 contains the control key index I(Qk) making it possible to recognize the datum $HASH_{Qk}$ within the message MEC as well as the key Qk making it possible to control the datum $HASH_{Qk}$.

The control words decryption circuit 30 contains the encryption key Kkj and the encryption key index I(Kkj).

Validation of the access conditions contained in the messages MEC is performed with the aid of a validation algorithm controlled by the key Qk when the control words decryption circuit 30 contains the key Kkj and the index I(Kkj).

The key index I(Kkj) makes it possible to recognize the encrypted control word E(Cwi)Kkj from among the set of encrypted control words. When the control word E(Cwi)Kkj has been recognized, the latter is transferred from the validation circuit 29 to the decryption circuit 30. The decryption of the encrypted control word E(Cwi)Kkj is then performed with the aid of the key Kkj of the encryption algorithm.

According to the preferred embodiment of the invention, the message MEC described in FIG. 3a comprises an encryption keys index field and the message MEC described in FIG. 3b comprises p encryption keys index fields and one control keys index field. As mentioned previously, these keys indices allow recognition by the user card of the data associated with them.

According to other embodiments of the invention, the messages MEC contain no encryption keys indices and/or control keys indices. The control words to be decrypted and the data making it possible to validate the messages MEC are recognized by the user card by virtue of their ordering and their size. In a manner known per se, the circuits 24 and 30 then contain items necessary for recognizing the ordering and size of the control words to be decrypted and the circuit 29 contains items necessary for recognizing the ordering and size of the data making it possible to validate and verify the messages MEC.

Irrespective of the type of message MEC of the invention, the invention relates, in the case of off-line systems, to an off-line information medium containing an item scrambled by a string of N control words, characterized in that it comprises p strings of items consisting of N encrypted control words, each string of items making it possible to descramble the scrambled item, p being an integer greater than or equal to 1.

The string of items consisting of the N encrypted control words consists of a string of identical encrypted control words, each control word being encrypted with an algorithm with different key.

Thus, the off-line information media according to the invention contain messages MEC such as those described in FIG. 3a or FIG. 3b. According to the invention, the messages MEC contained on the off-line information media then contain all the items necessary for descrambling the entire scrambled item.

FIGS. 3a and 3b therefore also constitute a symbolic representation of two MEC message format examples contained on the off-line information media according to the invention.

In the case in which the information medium contains several strings of items making it possible to descramble the scrambled item, each string of items is preferably associated with a different service provider.

The insertion of the messages MEC within the item contained on the off-line medium may be performed, by way of example, with the aid of the standard known to a person skilled in the art by the name "MPEG—2 System". In the case in which storage of the item on the off-line medium is not compatible with the "MPEG—2 System" standard, another mode of insertion of the messages MEC consists, for example, in retaining only one or a few messages MEC, for example 2 or 3 messages MEC, with the entirety of the programs contained on the medium and in placing these messages MEC in the header of each of the programs or of any other structure having a magnitude sufficient to store these few messages MEC.

According to a particular embodiment of the system described in FIG. 5, several different service suppliers can distribute identical programs on the same off-line information medium such as, for example, a digital video disc.

Advantageously, each service provider is then not compelled to press his own digital video discs. Various service providers can thus offer, on the same medium, all or some of their services at lesser cost without mutually disclosing their respective keys of the control words encryption algorithm.

The advantage described above in the context of an off-line system applies also in the context of an on-line system. Several disseminators of programs can then offer access to the same program using messages MEC such as those described in FIG. 3b.

The invention also has another advantage in the context of on-line systems.

Thus, in the context of on-line systems prohibiting any copying in clear of the scrambled programs disseminated, the invention allows the various service providers to control the use of copies and/or recordings of the scrambled programs. Thus, to see the copies and/or the recordings of the scrambled programs in clear, the users are then compelled to request entitlements from the service provider. The reading of the copies and/or the recordings is then conditioned by the presence or otherwise of the corresponding entitlements in the user's card.

All the advantages mentioned previously in respect of the off-line information media used in the context of the invention therefore also appertain in respect of the copies and/or the recordings of scrambled programs.

We claim:

1. A message for delivering access conditions to a service scrambled using a control word, said message containing:
   n items, each comprising said control word encrypted using n different encryption keys $K1, K2, \ldots, Kj, \ldots, Kn$,
wherein n is an integer greater than 1.

2. The message according to claim 1, further comprising n additional items, each comprising a key index associated with one of said n encryption keys.

3. The message according to claim 1, further comprising a second item for validating and verifying the content of said message, the content of said second item being controlled by a validation key Q, wherein said validation key Q is different from all said encryption keys $K1, K2, \ldots, Kj, \ldots, Kn$.

4. The message according to claim 1, wherein said encryption keys $Kj$ ($j=1, 2, \ldots, n$) have a size increasing with rank j of the key $Kj$.

5. A message for delivering access conditions to services delivered by p different service providers scrambled using a control word, said message containing:
   p first items, each for identifying one of said p service providers; and, for each of said p service providers of rank k ($k=1, 2, \ldots, p$):
   $v_k$ ($v_k=n, m, \ldots, v, \ldots, w$) second items, each comprising said control word encrypted using different encryption keys $Kk1, Kk2, \ldots, Kkj, \ldots, Kkv_k$;
wherein p and $v_k$ are integers greater than 1.

6. The message according to claim 5, further comprising, for each of said p service providers of rank k ($k=1, 2, \ldots, p$):
   $v_k$ ($v_k=n, m, \ldots, v, \ldots, w$) key index fields $I(Kk1), I(Kk2), \ldots, I(Kkj), \ldots, I(Kkv)$, wherein each key index is associated with one of said encryption keys.

7. The message according to claim 5, wherein said integer $v_k$ is different from one service provider to another or from one group of service providers to another.

8. The message according to claim 5, further comprising p additional items, each being associated with one of said service providers for validating and verifying access conditions to the service as well as the content of the message relating to the service provider with which each said p additional item is associated, the content of each of said p additional items being controlled by a validation key $Q1, Q2, \ldots, Qp$ which is individual thereto.

9. The message according to claim 8, wherein said validation keys $Q1, Q2, \ldots, Qp$ are different from all said encryption keys.

10. The message according to claim 5, wherein successive encryption keys of at least one service provider have a size increasing with the rank of the key.

11. A method for descrambling a service scrambled using a control word, said method comprising the step of:

supplying a message containing access conditions associated with a user and n-items, each comprising said control word encrypted using n different encryption keys K1, K2, . . . , Kj, . . . , Kn, wherein n is an integer greater than 1.

12. The method according to claim 11, wherein the step of supplying said message is performed with the aid of a second item for validating and verifying the content of said message, the content of said second item being controlled by a validation key Q, said validation key Q being different from all said encryption keys K1, K2, . . . , Kj, . . . , Kn.

13. A method for descrambling services, delivered by p different service providers, scrambled using a control word, said method comprising the step of:

supplying a message containing access conditions associated with a user together with p first items, each for identifying one of said p service providers; said message further comprising, for each service provider of rank k (k=1, 2, . . . , p):

$v_k$ ($v_k$=n, m, . . . , v, . . . , w) second items, each comprising said control word encrypted using different encryption keys Kk1, Kk2, . . . , Kkj, . . . , Kkv;

wherein p and $v_k$ are integers greater than 1.

14. The method according to claim 13, wherein the step of supplying said message further comprises, for each of said p service providers of rank k (k=1, 2, . . . , p):

distributing $v_k$ ($v_k$=n, m, . . . , v, . . . , w) key index fields I(Kk1), I(Kk2), . . . , I(Kkv) (k=1, 2, . . . , p), each key index being associated with one of said encryption keys.

15. The method according to claim 14, wherein the step of supplying said message further comprises:

distributing p additional items $HASH_{Q1}$, . . . , $HASH_{Qk}$, . . . , $HASH_{Qp}$, each of said additional items being associated with one of said service providers for validating and verifying access conditions to the service as well as the content of the message relating to the service provider with which said item is associated, the content of each of said p additional items being controlled by a validation key Q1, Q2, . . . , Qp which is individual thereto.

16. The method according to claim 15, wherein said validation keys Q1, Q2, . . . , Qp are different from all said encryption keys.

17. A smart card for providing a control word for descrambling a received scrambled service comprising:

means for receiving a first message, said first message containing data corresponding to access conditions associated with a user and n items each comprising said control word encrypted using n different encryption keys K1, K2, . . . , Kj, . . . , Kn, wherein n is an integer greater than 1; and means for validating said first message using a validation key Q;

wherein said validation key Q is different from all said encryption keys.

18. The smart card according to claim 17, further comprising:

means for receiving a second message, said second message containing data corresponding to entitlements associated with said user;

means for validating said second message using a control key KC;

wherein said control key KC is different from said validation key Q for validating said first message.

19. The smart card according to claim 18, wherein said control key is different from all said encryption keys.

20. The smart card according to claim 17, further comprising:

deciphering means for decrypting said encrypted control word, wherein said deciphering means includes at least one of said encryption keys.

21. The smart card according to claim 20, wherein said deciphering means further includes:

means for recognizing in said first message an item containing said control word encrypted using an encryption key contained in said deciphering means.

22. The smart card according to claim 17, wherein said validation means comprises means for recognizing in said message an item, associated with said service provider delivering said scrambled service, for validating and verifying access conditions to said service as well as the content of said message, the content of said item being controlled by said validation key Qk.

23. The smart card according to claim 22, wherein said means comprises a validation key index I(Qk).

24. A conditional access system for selectively supplying services to a user comprising:

means for providing a service scrambled using a control word, entitlement data associated with said user's entitlements and access conditions data associated with access conditions, said access conditions data containing n items each comprising said control word encrypted using n different encryption keys K1, K2, . . . , Kj, . . . , Kn, wherein n is an integer greater than 1;

a decoder for descrambling said scrambled service;

a smart card for receiving said entitlement data and said access condition data and for providing said control word to said decoder, wherein said smart card comprises deciphering means for decrypting said encrypted control word, said deciphering means containing at least one of said encryption keys.

25. The conditional access system according to claim 24, wherein said system is an "on-line" type.

26. The conditional access system according to claim 24, wherein said system is an "off-line" type.

27. A conditional access system for selectively supplying services delivered by p different service providers to a user comprising:

means for providing a service scrambled using a control word, entitlement data associated with said user's entitlements and access condition data associated with access conditions;

a decoder for descrambling said scrambled service;

a smart card for receiving said entitlement data and said access condition data and for providing said control word to said decoder, wherein said access conditions data are conveyed to said smart card in a message containing p first items, each for identifying one of said p service providers; and, for each of said p service providers of rank k (k=1, 2, . . . , p):

$v_k$ ($v_k$=n, m, . . . , v, . . . , w) second items, each comprising said control word encrypted using different encryption keys Kk1, Kk2, . . . , Kkj, . . . , Kkv$_k$;

wherein p and $v_k$ are integers greater than 1; and wherein said smart card includes:

means for receiving a first message, said first message containing data corresponding to access conditions associated with a user and n items each comprising said control word encrypted using n different encryption keys K1, K2, ..., Kj, ..., Kn, wherein n is an integer greater than 1; and means for validating said first message using a validation key Q;

wherein said validation key Q is different from all said encryption keys.

28. The conditional access system according to claim 27, wherein said system is an "on-line" type.

29. The conditional access system according to claim 27, wherein said system is an "off-line" type.

30. An off-line information medium containing:

data scrambled using a string of N control words Cw1, ..., Cwi, ... CwN, N being an integer greater than 1; and for each of said N control words Cwi:

a string of additional data comprising said control word encrypted using different encryption keys K11, ..., K1n, K21, ..., K2m, Kk1, ..., Kkv, Kp1, ... Kpw.

31. The off-line information medium according to claim 30, further comprising:

access conditions to said scrambled data;

a second item for validating and verifying said access conditions;

wherein said second item is controlled by a validation key different from all said encryption keys.

32. The off-line information medium according to claim 30, further comprising:

access conditions to said scrambled data;

p first additional items, each for identifying one among p service providers;

p second additional items, each being associated with one of said service providers for validating and verifying said access conditions as well as information specific to said service provider corresponding to it;

wherein the string of additional items comprising said control word encrypted using different encryption keys is broken down into p data sub-sets, each of said p data sub-sets being associated with a different service provider.

33. The off-line information medium according to claim 32, wherein said second additional items are controlled by validation keys which are different from all said encryption keys.

34. The off-line information medium according to claim 32, further comprising, for each item of said string of additional items comprising said control word encrypted using different encryption keys, an encryption index for recognizing the encrypted control word.

35. A smart card for providing a control word for descrambling a received scrambled service delivered by one among p different service providers comprising:

means for receiving a message, said message containing data corresponding to access conditions associated with a user and containing:

p first items, each for identifying one of said p service providers; and, for each of said p service providers of rank k (k=1, 2, ..., p):

$v_k$ ($v_k$=n, m, ..., v, ..., w) second items, each comprising said control word encrypted using different encryption keys Kk1, Kk2, ..., Kkj, ..., Kkv$_k$ wherein p and $v_k$ are integers greater than 1;

means for validating said message using a validation key Qk which is associated with said service provider delivering the scrambled service, wherein said validation key Qk is different from all said encryption keys.

* * * * *